United States Patent
Hussain et al.

(10) Patent No.: US 12,443,593 B1
(45) Date of Patent: Oct. 14, 2025

(54) SYSTEM AND A METHOD FOR DATA TRANSFORMATION USING A SPREADSHEET-LIKE USER INTERFACE

(71) Applicants: Shuveb Hussain, Chennai (IN); Arun Venkataswamy, Chennai (IN); Narendran HAriparant Haman, Chennai (IN); Rao Koteswara, Los Altos, CA (US)

(72) Inventors: Shuveb Hussain, Chennai (IN); Arun Venkataswamy, Chennai (IN); Narendran HAriparant Haman, Chennai (IN); Rao Koteswara, Los Altos, CA (US)

(73) Assignee: Zipstack, Los Altos, CA (US)

( * ) Notice: Subject to any disclaimer, the term of this patent is extended or adjusted under 35 U.S.C. 154(b) by 0 days.

(21) Appl. No.: 18/635,915

(22) Filed: Apr. 15, 2024

Related U.S. Application Data

(60) Provisional application No. 63/496,193, filed on Apr. 14, 2023.

(51) Int. Cl.
*G06F 16/242* (2019.01)
*G06F 16/25* (2019.01)
*G06F 40/18* (2020.01)

(52) U.S. Cl.
CPC ........ *G06F 16/2423* (2019.01); *G06F 16/258* (2019.01); *G06F 40/18* (2020.01)

(58) Field of Classification Search
CPC ..... G06F 16/2423; G06F 16/258; G06F 40/18
See application file for complete search history.

(56) References Cited

U.S. PATENT DOCUMENTS

| | | | |
|---|---|---|---|
| 2015/0128018 A1* | 5/2015 | Hurlbut ................. | G06Q 40/02 715/212 |
| 2016/0019281 A1* | 1/2016 | Hariharan ........... | G06F 16/2452 707/783 |
| 2016/0350276 A1* | 12/2016 | Gulwani ............... | G06F 40/177 |
| 2019/0163684 A1* | 5/2019 | Hurlbut ................ | G06F 40/174 |
| 2022/0366129 A1* | 11/2022 | Dong .................... | G06F 40/137 |

* cited by examiner

*Primary Examiner* — Dangelino N Gortayo
(74) *Attorney, Agent, or Firm* — Joy S Goudie

(57) ABSTRACT

A system and method for data transformation using a spreadsheet paradigm-based user interface are disclosed. Data stored in a data table is processed and a subset of data is extracted. Spreadsheet-specific data processing options are displayed on a user interface along with the subset of the data, and a user is prompted to select one of the spreadsheet-specific data processing options. Subsequently, data processing actions corresponding to the user-selected spreadsheet-specific data processing options are identified. Subsequently, database queries are automatically generated for manipulating the subset of data, and the user-selected spreadsheet-specific data processing options and corresponding actions are programmatically transformed into database queries. The database queries, initially specific to the subset of data, are extrapolated to the entire data table, and corresponding spreadsheet-specific data processing options and actions are implemented on the entire data table, resulting in creation of transformed and updated data.

14 Claims, 2 Drawing Sheets

SYSTEM AND A METHOD FOR DATA TRANSFORMATION USING A SPREADSHEET-LIKE USER INTERFACE

CROSS-REFERENCE TO RELATED APPLICATIONS

The present application claims the priority of the U.S. Provisional Patent Application No. 63/496,193, filed on Apr. 14, 2023, and titled "A System and Method for Data Transformation Using a Spreadsheet—Like User Interface." The contents of the abovementioned US Provisional Patent Application are incorporated herein in their entirety by way of reference.

BACKGROUND

The embodiments described herein, in general, relate to the field of data transformation. Particularly, the embodiments relate to spreadsheet paradigm-based user interface that facilities data transformation. More particularly, the embodiments relate to a no-code SQL user interface that facilitates automatic transformation of the data stored in a relational database.

Businesses, enterprises, and other organizations use databases to store and manage information ranging from inventory, clients, accounts, products, and the like. Moreover, businesses often need to manage and merge data from many sources, including business partners, data feeds, legacy systems, and the like. Dramatic growth of the Internet and electronic commerce has increased businesses' reliance on the ability to capture, use, and integrate data from multiple sources encoded using different data schemas. Transforming data from one schema to another requires data mappings between data source(s) and a data target. While transactional data is present in OLTP (online transaction processing) systems, such transactional data often needs to be transformed into OLAP (online analytical processing) systems in order to be able to address complex business needs and requirements which often cannot be addressed directly by transactional systems that store low-level transactional details.

In this information age, data transformation, i.e., the modification or re-arrangement of data from one form into another, has become a ubiquitous task. While many data transformation tasks are relatively straightforward, many others are complex and carry significant consequences for failure to correctly transform data as designed.

Data transformation is a technically challenging step in modeling data for businesses, analytical, and operational use cases. Despite its pervasiveness and importance, data transformation remains a cumbersome and time-consuming task, due to schema matching and mapping specification. Data-driven organizations use data for analytical and operational purposes, but the data needs to be transformed to address various queries. Hence data transformation is a fundamental step in data modeling for specific purposes.

Currently, the major way to transform data is through full-code methods, such as Python or SQL, or by using certain low-code/no-code (LCNC) tools that have user interfaces that the users need to learn new. The full-code methods of data transformation should involve a lot of expertise, and a steep learning curve is required in the method where LCNC tools are used since there is a need to learn a new user interface. Therefore, due to its highly technical nature, highly skilled personnel are required to work on data transformation involving full-code methods. With the number of data sources exploding and a multitude of business houses wishing to make data-driven decisions, data engineering teams everywhere are burdened with increased work.

Furthermore, writing transformations using powerful transformation languages, such as SQL/XML, XSLT, and XQuery by hand is difficult and error-prone. As a result, mapping technology was developed to help automate the process. Visual mapping tools are used to specify higher-level and language-neutral methods to transform a source instance to a target instance. Mapping specifications generated from such methods are translated into executable code, such as XSLT, XQuery, Java, and C#, and later deployed to a runtime engine for transformation and execution.

However, most mapping tools display source schema located on one side and target schema on the other side. Further, lines are used to connect the elements of the two schemas. Further, the lines are annotated with one or more functions to specify complex relationships. Thus the ensuing flow chart-like interface is typically cluttered and unintuitive. Also, the complexity of the flow chart-like interface is aggravated if the number of elements of the source and the target schemas are large and multiple lines with annotated functions connect the elements of the two schemas. Furthermore, built-in functions provided by these mapping tools are unfamiliar to users having no experience with complex database programming.

Hence, in view of the aforementioned drawbacks, there is felt a need to facilitate no-code data transformation, and envisage methods and tools that enable both professional programmers and business users to transform data into a structured format in an effective and efficient manner.

The principal object of the present disclosure is to provide a system and a method for data transformation using a spreadsheet paradigm-based user interface.

Another object of the present disclosure is to provide a system and method that uses a no-code SQL user interface for transforming the data stored in a relational database.

Yet another object of the present disclosure is to provide a spreadsheet-identical User Interface (UI) that enables users to transform data effectively and easily by using familiar spreadsheet paradigms.

Yet another object of the present disclosure is to provide a spreadsheet-identical UI that enables a user to repetitively manipulate the source data until it is transformed into desired target data.

Yet another object of the present disclosure is to provide data transformation systems and methods that enable both professional programmers, users with a non-technical users, and business users to transform data into a structured format effectively and efficiently.

Yet another object of the present disclosure is to provide data transformation systems and methods that enhance user productivity by enabling users to transform humungous amounts of data independent of database programs and database software.

Yet another object of the present disclosure is to provide data transformation systems and methods that use a spreadsheet paradigm-based UI to capture and record the data manipulations made by users.

Yet another object of the present disclosure is to provide data transformation systems and methods that extract sample data for transformation from a database, and extrapolate the actions performed on the sample data to the entirety of the database.

The present disclosure envisages a system and method for transforming data stored in a relational database from a source format to a user-desired or user-specific target format using a no-code SQL approach. The use of no-code SQL approach also involves creating and implementing a spreadsheet paradigm-based user interface that automatically transforms user actions and user inputs, directed to manipulation of data, into executable database queries that are subsequently implemented on the data stored in the relational database.

The spreadsheet paradigm-based user interface is created based on the spreadsheet paradigm, follows a no-code Structured Query Language (SQL) approach, facilitates spreadsheet-identical user interaction, and allows users to interact with databases and transform the data stored thereon into a desired format, independent of any software program codes, especially software program codes directed to manipulation of data stored in relational database systems.

The system envisaged by the present disclosure incorporates a user interface that is based on the spreadsheet paradigm and follows a no-code SQL approach. The operations of the user interface (envisaged by the present disclosure) and the functionalities embedded in the user interface are substantially similar to the operations and functionalities of commonly used electronic spreadsheet programs. The design elements of the user interface are also substantially similar to the design elements found in commonly used electronic spreadsheet programs.

The user interface envisaged by the present disclosure is referred to as a spreadsheet paradigm-based user interface since the user interface is substantially similar to commonly used electronic spreadsheet programs in terms of features and functionalities. Further, the user interface envisaged by the present disclosure is also referred to as a no-code SQL user interface since it cooperates with a pre-configured processor and facilitates automatic conversion of user inputs and user actions into database queries, for instance, SQL queries, without necessitating the users to manually create such database queries.

In accordance with the present disclosure, the spreadsheet paradigm-based user interface is based on an electronic spreadsheet paradigm and embodies data visualization and manipulation-related features that are substantially similar to those of such commonly used electronic spreadsheets.

In accordance with the present disclosure, the data stored in a relational database is manipulated and transformed based on the user actions and user inputs provided via the user interface, but without necessitating the user to create any database queries or explicitly create any software programs for manipulating the data stored in the relational database.

The user inputs and user actions provided via the spreadsheet paradigm-based user interface are interpreted by the processor and converted into corresponding database queries. Finally, the data stored in the relational database is transformed by the implementation of the database queries, which, in turn, are automatically created based on the user actions and user inputs provided via the user interface. The database queries are automatically created by the processor and without necessitating any user intervention and without necessitating user-developed software programs.

BRIEF DESCRIPTION OF THE DRAWINGS

The other objects, features and advantages will be apparent to those skilled in the art from the following description and the accompanying drawings in which.

DETAILED DESCRIPTION

Figure 1:
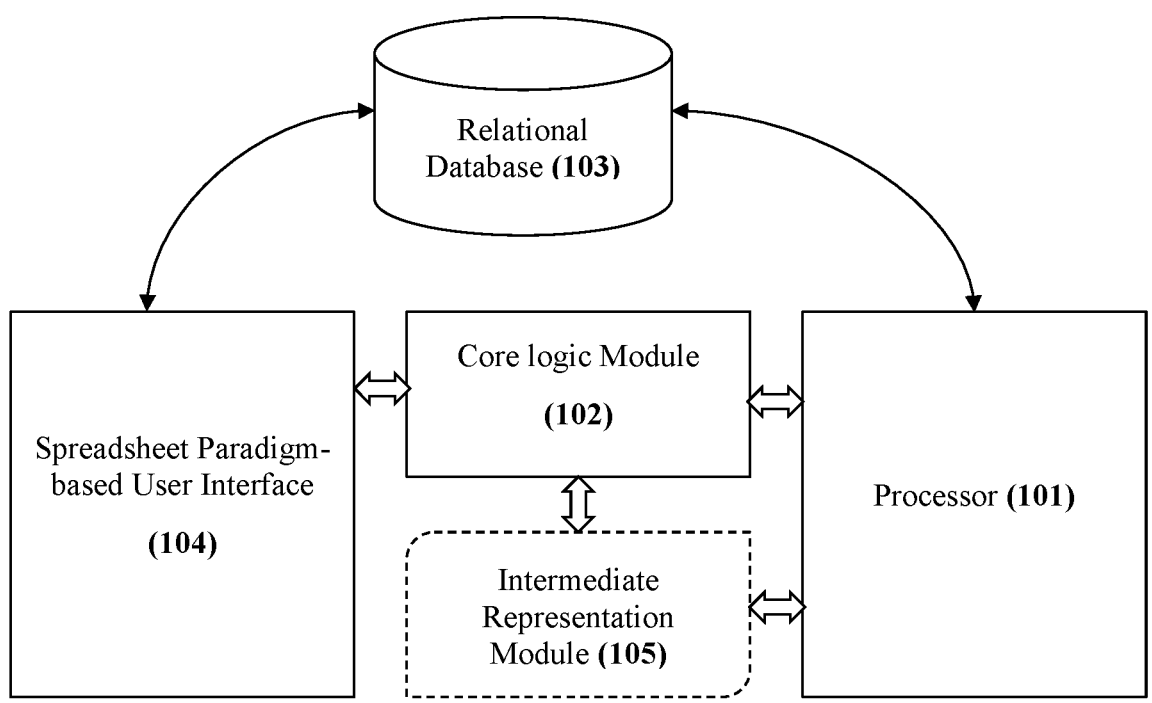
FIG. 1 illustrates a block-diagram of a system for transforming data from an source format (initial state) to a user-desired format (final state), using a spreadsheet paradigm-based user interface.

The embodiments of the present disclosure envisage a system and a method for data transformation using a spreadsheet-identical user interface (UI). The user interface is created based on the spreadsheet paradigm, follows a no-code Structured Query Language (SQL) approach, facilitates spreadsheet-identical user interaction, and allows users to interact with databases and transform the data stored thereon into a desired format, independent of any software program codes, especially software program codes directed to manipulation of data stored in relational database systems.

The system envisaged by the present disclosure incorporates a user interface that is based on the spreadsheet paradigm and follows a no-code SQL approach. The operations of the user interface (envisaged by the present disclosure) and the functionalities embedded in the user interface are substantially similar to the operations and functionalities of commonly used electronic spreadsheet programs. The design elements of the user interface are also substantially similar to the design elements found in commonly used electronic spreadsheet programs.

The user interface envisaged by the present disclosure is referred to as a spreadsheet paradigm-based user interface since the user interface is substantially similar to commonly used electronic spreadsheet programs in terms of features and functionalities. Further, the user interface envisaged by the present disclosure is also referred to as a no-code SQL user interface since it cooperates with a pre-configured processor and facilitates automatic conversion of user inputs and user actions into database queries, for instance, SQL queries, without necessitating the users to manually create such database queries.

The system envisaged by the present disclosure includes a computer-based processor that has been configured to implement a plurality of functional modules. The functional modules implemented by the processor include the spreadsheet paradigm-based user interface, at least one relational database, an interface module that interfaces with the relational database, a core logic module, and an intermediate representation module.

In accordance with the present disclosure, the spreadsheet paradigm-based user interface is based on an electronic spreadsheet paradigm and embodies data visualization and manipulation-related features that are substantially similar to those of such commonly used electronic spreadsheets.

In accordance with the present disclosure, the interfacing module is configured to extract a subset of the data stored in the relational database for manipulation and transformation thereof, based on the corresponding user actions executed through the user interface.

The core logic module, in accordance with the present disclosure, comprises logic implemented in software, to reconfigure the data on the basis of user actions and user inputs provided via the user interface. The core logic module interprets the user inputs and user actions, converts such user inputs and actions into corresponding database queries, and transforms the data by executing the said database queries. The core logic module, in accordance with the present disclosure, is configured to convert or transform the data, originally stored in the relational database, into a user-specified format, based on the user actions and inputs rendered through the user interface.

In accordance with the present disclosure, the core logic module is also configured to work in a reverse direction, i.e., convert the data which is in a user-specified format to another format recognized by the software paradigm-based user interface and the relational database. The core logic module also operates to serialize or deserialize data transformation as expressed by users. Furthermore, the core logic module also comprises validation logic utilized by the user interface to maintain data consistency and coherence.

In accordance with the present disclosure, the relational database incorporates at least one data table, for instance, a first data table that comprises predetermined data arranged in a plurality of rows and a plurality of columns. In accordance with an exemplary embodiment of the present disclosure, the data stored in the first data table of the relational database includes values of a plurality of attributes.

In accordance with the present disclosure, the intermediate representation module comprises a plurality of intermediate representations of data to which various user actions and user inputs can be programmatically applied for manipulating and transforming the data. In accordance with the present disclosure, the intermediate representation module also facilitates serialization and de-serialization of transformed data.

In accordance with the present disclosure, the spreadsheet paradigm-based user interface captures or records user actions and user inputs. For instance, when a user performs actions, including sorting, filtering, or application of predetermined formulae, the spreadsheet paradigm-based user interface cooperates with the processor to capture such sorting actions, filtering actions, or actions involving application of predetermined formulae. The processor also tracks the effect of application of such sorting actions, filtering actions, or actions involving application of predetermined formulae on the underlying data. Furthermore, the processor also tracks the changes in the data, from an initial state thereof to any intermediate states and lastly to a final state.

In accordance with the present disclosure, the sorting actions, filtering actions, or actions involving application of predetermined formulae on the underlying data are used as the basis for creating database queries, preferably SQL queries. Preferably, the spreadsheet paradigm-based user interface acts as a no-code SQL generation tool in the sense that it cooperates with a processor to translate user actions and inputs into executable SQL queries without users having to manually create such SQL queries.

In accordance with the present disclosure, the data stored on a predetermined data table of the relational database is transformed in a series of steps, based on the user inputs and user actions provided through the software paradigm-based user interface.

However, the data table typically includes a multitude of rows and columns filled with data. Furthermore, loading the data table in its entirety to the user interface to effect data transformation is technically and operationally not feasible given the sheer volume of data that could potentially be stored in a data table of the relational database. Therefore, the processor envisaged by the present disclosure extracts a subset of the data stored in the data table. For example, the extracted subset of data includes the first 'hundred' columns of the data table. Further, it is within the scope of the present disclosure to extract any number of columns from a data table, and the possibility of extraction of the first 'hundred' columns of the data table should be construed only as an example and not as a limitation.

In accordance with the present disclosure, the core logic module, implemented by the processor, reads the inputs/actions provided by a user against the subset of data loaded onto the spreadsheet paradigm-based user interface from the data table. Preferably, various actions analogous to the actions performed on electronic spreadsheet applications, including, sorting actions, filtering actions, or actions involving application of predetermined mathematical formulae are identified and recorded by the core logic module. Subsequently, the actions performed by the user are automatically converted into SQL queries and the SQL queries are extrapolated to the data table in its entirety, and the data contained within the data table is transformed in line with the sorting actions, filtering actions, or actions involving application of predetermined mathematical formulae.

Preferably, the core logic module converts the data into a user-specified format by implementing a series of SQL queries corresponding to the filtering actions, sorting actions, actions involving selection of values for predetermined data fields, or actions involving application of predetermined mathematical formulae to predetermined data values stored in predetermined data fields.

FIG. 1 illustrates a block diagram of a system that facilitates transformation of data from a source format (initial state) to a user-specified target format (final state). In accordance with the present disclosure, the system 100 comprises a processor 101 that cooperates with a relational database 103. The relational database 103, in accordance with the present disclosure, stores at least a first data table (not shown in figures) in which data to be manipulated and transformed is stored. Preferably, the data is arranged in a plurality of rows and a plurality of columns. In an exemplary embodiment, the data stored in the first table of the relational database 103 comprises values of a plurality of data attributes.

In accordance with the present disclosure, the data stored in the first data table of the relational database 103 is processed by the processor 101 and a subset of the data is extracted for transformation. In accordance with the present disclosure, since the first data table includes a multitude of rows and columns filled with data, for technical and operational feasibility-related reasons, the processor 101 extracts only a subset of data from the first data table. Preferably, the processor 101 extracts the first 'hundred' columns of the first data table.

In accordance with the present disclosure, the processor 101 programmatically embeds a plurality of spreadsheet-specific data processing options (for example, in the form of selectable icons or selectable drop-down menu items) into the spreadsheet paradigm-based user interface 104. In accordance with the present disclosure, the spreadsheet-specific data processing options are rendered accessible to a user (of the software paradigm-based user interface 104) for manipulating the subset of data that has been extracted from the first data table of the relational database 103.

In accordance with the present disclosure, the spreadsheet paradigm-based user interface 104 is based on an electronic spreadsheet paradigm and embodies data visualization and manipulation-related features that are substantially similar to those of such commonly used electronic spreadsheets.

In accordance with the present disclosure, the processor 101 triggers the spreadsheet paradigm-based user interface 104 to display the subset of data in a predetermined format.

Furthermore, alongside the subset of data, the spreadsheet-specific data processing options are also displayed on the spreadsheet paradigm-based user interface 104.

In accordance with the present disclosure, the user is prompted, through the spreadsheet paradigm-based user interface 104, to select at least one of the displayed spreadsheet-specific data processing options for manipulating and transforming the subset of data. In accordance with the present disclosure, the processor 101 programmatically identifies the spreadsheet-specific data processing options selected by the user for manipulating the subset of data. Further, the processor 101 also programmatically identifies one or more corresponding actions to be implemented on the subset of data, in line with the spreadsheet-specific data processing options selected by the user.

In accordance with the present disclosure, the processor 101 cooperates with the core logic module 102 to programmatically identify the spreadsheet-specific data processing options selected by the user for manipulating the subset of data, and to identify the corresponding actions to be implemented on the subset of data, in line with the spreadsheet-specific data processing options selected by the user.

Subsequently, the processor 101, in cooperation with the core logic module 102, automatically generates one or more database queries for executing the necessary actions on the subset of data. In this manner, the processor 101 transforms the spreadsheet-specific data processing options and the corresponding actions into one or more database queries. In accordance with a preferred embodiment of the present disclosure, the database queries are Structured Query Language (SQL)-based queries. However, it is possible that the database queries could also belong to other database technologies such as MySQL and the like. Therefore, reference to SQL queries in the present disclosure should not be construed in a limiting sense and should be viewed only as an example.

In accordance with the present disclosure, the core logic module 102 is also configured to work in a reverse direction, i.e., convert the data which is in a user-specified format to another format recognized by the software paradigm-based user interface 104 and the relational database 103. The core logic module 102 also operates to serialize or deserialize data transformation as expressed by users. Furthermore, the core logic module 102 also comprises validation logic utilized by the software paradigm-based user interface 104 to maintain data consistency and coherence.

In accordance with the present disclosure, the processor 101 implements the one or more database queries on the subset of data, and triggers the spreadsheet paradigm-based user interface 104 to display the results of implementation of the one or more database queries on the subset of data. Subsequently, the processor 101 programmatically extrapolates the database queries to the entirety of the first data table stored in the relational database 103 and thereby implements the spreadsheet-specific data processing options selected by the user and the corresponding actions on the entirety of the first data table stored in the relational database 103. In this manner, the whole of the data stored in the first data table of the relational database 103 is processed in line with the database queries that had initially been applied only to the subset of data extracted from the first data table of the relational database 103.

In accordance with the present disclosure, subsequent to executing the database queries on the entirety of the first data table stored in the relational database 103, i.e., on the whole of the data stored in the first data table, the processor 101 programmatically updates the data stored in the first data table, based on the resultant of the execution of the database queries, and creates updated data.

In accordance with the present disclosure, since the updated data is created as a resultant of the execution of one or more database queries on the data stored in the first data table, it represents the data that has been manipulated and transformed in line with the spreadsheet-specific data processing options initially selected by the user and the corresponding actions programmatically identified by the processor 101.

In accordance with the present disclosure, the processor 101 stores the updated data in a second data table (not shown in figures), which, in turn, is stored into the relational database 103.

In accordance with the present disclosure, the processor 101 cooperates with an intermediate representation module 105 to generate a plurality of intermediate representations based on the spreadsheet-specific data processing options selected by the user and corresponding actions. In accordance with the present disclosure, the one or more database queries are at least partially based on the intermediate representations. Further, the intermediate representations include details indicative of the spreadsheet-specific data processing options selected by the user, the corresponding actions identified by the processor 101, the source data table (i.e., the first data table), and the destination data table (i.e., the second data table).

Figure 2:
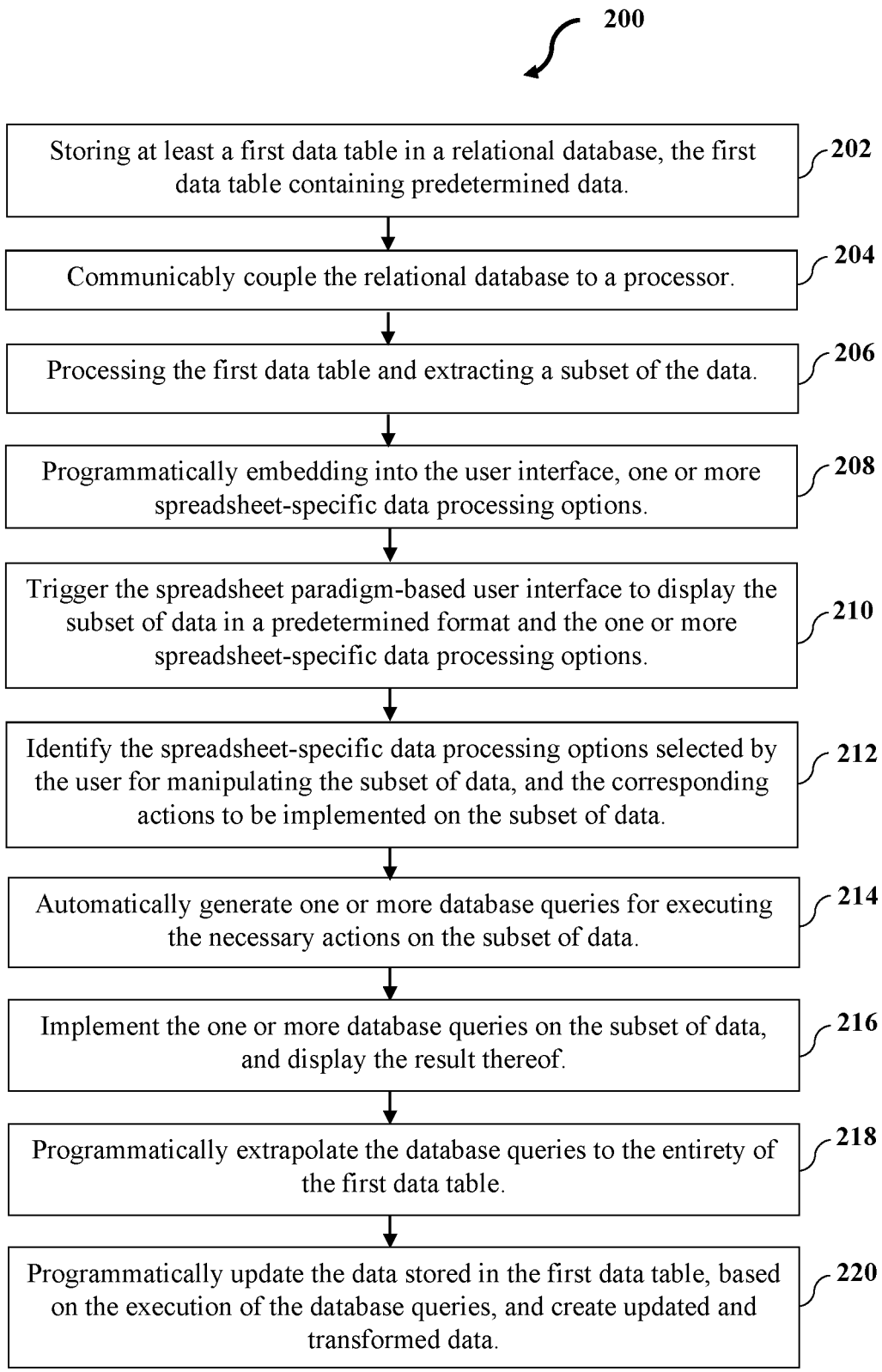
FIG. 2 illustrates a flowchart of a method for transforming data from an source format (initial state) to a user-desired format (final state), using a spreadsheet paradigm-based user interface.

FIG. 2 illustrates a flowchart that describes the steps involved in transformation of data from a source format (initial state) to a user-specified target format (final state), using a combination of the processor 101 and the spreadsheet paradigm-based user interface 104.

At step 202, a first data table is stored in the relational database 103. The first data table comprises predetermined data arranged in a plurality of rows and a plurality of columns. Further, the predetermined data comprises values of a plurality of attributes.

At step 204, the processor 101 is communicably coupled to the relational database 103. At step 206, the processor 101 processes the first data table and extracts a subset of the data. As discussed above, since the first data table includes a multitude of rows and columns filled with data, for technical and operational feasibility-related reasons, the processor 101 extracts only a subset of data from the first data table. Preferably, the processor 101 extracts the first 'hundred' columns of the first data table.

At step 208, the processor 101 programmatically embeds into the spreadsheet paradigm-based user interface 104, one or more spreadsheet-specific data processing options usable for manipulating the subset of data.

At step 210, the processor 101 triggers the spreadsheet paradigm-based user interface 104 to a) display the subset of data in a predetermined format, and b) display the one or more spreadsheet-specific data processing options for facilitating manipulation of the subset of data.

At step 212, the processor 101 identifies the spreadsheet-specific data processing options selected by the user for manipulating the subset of data, and the corresponding actions to be implemented on the subset of data, in line with the spreadsheet-specific data processing options selected by the user.

At step 214, the processor 101, in cooperation with the core logic module 102, automatically generates one or more database queries for executing the necessary actions on the subset of data. In this manner, the processor 101 transforms the spreadsheet-specific data processing options and the corresponding actions into one or more database queries.

At step 216, the processor 101 implements the one or more database queries on the subset of data, and triggers the spreadsheet paradigm-based user interface 104 to display the results of implementation of the one or more database queries on the subset of data.

Subsequently, at step 218, the processor 101 programmatically extrapolates the database queries to the entirety of the first data table stored in the relational database 103 and thereby implements the spreadsheet-specific data processing options selected by the user and the corresponding actions on the entirety of the first data table stored in the relational database 103. In this manner, the whole of the data stored in the first data table of the relational database 103 is processed in line with the database queries that had initially been applied only to the subset of data extracted from the first data table of the relational database 103.

Subsequent to executing/implementing the database queries on the entirety of the first data table stored in the relational database 103, i.e., on the whole of the data stored in the first data table, at step 220, the processor 101 programmatically updates the data stored in the first data table, and creates updated data that has been transformed based on the user actions and inputs received through the software paradigm-based user interface 104.

In accordance with the present disclosure, since the updated data is created as a resultant of the execution of one or more database queries on the data stored in the first data table, it represents the data that has been manipulated and transformed in line with the spreadsheet-specific data processing options initially selected by the user and the corresponding actions programmatically identified by the processor 101.

In accordance with the present disclosure, a computer program product for implementing the aforementioned method and the process step embodied therein is also envisaged. The computer program product, in accordance with the present disclosure, is implemented by a combination of the processor 101 and the spreadsheet paradigm-based user interface 104.

A spreadsheet paradigm-based no-code SQL user interface for manipulating and transforming data is disclosed. The said user interface adopts a spreadsheet paradigm and embodies features and functions found in commonly used electronic spreadsheet programs. One of the advantages of a spreadsheet paradigm-based user interface is that it can be used by programmers and business users alike. Another advantage of the spreadsheet paradigm-based user interface is that it allows users to implement data manipulation and transformation-related operations without creating database querying software program codes. Furthermore, as the spreadsheet paradigm-based user interface resembles common spreadsheet software, there is a significant reduction in the learning curve associated with using the said user interface in a productive and efficient manner.

Data transformation is a technically challenging step in data modeling that requires highly skilled personnel. With a substantial increase in the amount of data available for analysis, data engineering teams and knowledge workers are made to deal with humungous amount of analytical data on a daily basis. By leveraging the spreadsheet paradigm-based user interface, data engineers and knowledge workers could enhance their productivity since they do not have to write any software programs or codes for transforming the data into a desired format. Also, the spreadsheet paradigm-based user interface enables non-technical users and non-technical domain experts to effectively and efficiently process substantial amounts of data and enables them to participate in the process of data transformation and data modeling, without them having to create complex database querying programs.

Furthermore, Structured Query Language (SQL) or its derivatives that are typically utilized in data transformation are used by the spreadsheet paradigm-based user interface to automatically create appropriate and valid database queries. The present disclosure envisages a juxtaposition of the capabilities of Structured Query Languages and user-friendly operation of electronic spreadsheet programs. The present disclosure combines the data management abilities of Structured Query Languages with the user-friendly implementation of electronic spreadsheet programs, thereby allowing users to automatically create database queries in a Structured Query Language by interacting with the data displayed in an electronic spreadsheet.

The present disclosure envisages a no-code approach wherein database queries are programmatically and automatically generated by a processor without the need for end users to manually create them. The present disclosure leverages a spreadsheet paradigm-based no-code SQL user interface that utilizes users' familiarity with and the knowledge of commonly used electronic spreadsheets and extrapolates such familiarity and knowledge to data analytics, and enables users to extrapolate their familiarity and knowledge of electronic spreadsheets to perform complex data transformations and analyses. The no-code approach envisaged by the present disclosure also allows non-technical users to contribute to data transformation, a task that was previously managed only by highly skilled software programmers and database specialists. Even software programmers and database specialists who possess SQL knowledge could leverage the no-code paradigm envisaged by the present disclosure to save their precious time and to perform data transformation in a far more effective and efficient manner.

What is claimed is:

1. A computer-implemented system for transforming data from a source format to a user-desired target format, said system comprising:
   a relational database configured to store at least a first data table, said first data table comprising predetermined data arranged in a plurality of rows and a plurality of columns, said predetermined data comprising values of a plurality of attributes;
   a processor communicably coupled to said relational database, said processor configured to:
      process said first data table incorporating said predetermined data and programmatically extract a subset of said predetermined data;
      programmatically embed into a user interface, one or more spreadsheet-specific data processing options usable for manipulating at least said subset of said predetermined data;
      trigger said user interface to display said subset of predetermined data in a predetermined format and to display said one or more spreadsheet-specific data processing options for facilitating manipulation of said subset of predetermined data;
      identify said one or more spreadsheet-specific data processing options selected by a user for manipulating said subset of predetermined data, and further identify one or more corresponding actions to be implemented on said subset of predetermined data;
      automatically generate one or more database queries for executing said one or more actions on said subset of predetermined data, based on said one or more spreadsheet-specific data processing options selected by said user, and thereby programmatically transform said one or more spreadsheet-specific data processing options and said one or more corresponding actions into said one or more database queries;

implement said one or more database queries on said subset of predetermined data;

programmatically extrapolate said one or more database queries to said predetermined data stored on said first data table, and thereby implement said one or more spreadsheet-specific data processing options and said one or more corresponding actions on said predetermined data stored on said first data table, and wherein said one or more database queries are extrapolated to an entirety of said first data table, thereby enabling the processor to:

process the entirety of said predetermined data stored in said first data table, based on said one or more database queries that were previously applied only to said subset of predetermined data extracted from said first data table; and implement said one or more spreadsheet-specific data processing options on the entirety of said first data table and the entirety of said predetermined data stored thereon;

programmatically update said predetermined data stored on said first data table based on implementation of said one or more database queries on said first data table, and create updated data; and wherein said processor is further configured to generate a plurality of intermediate representations indicative of said one or more spreadsheet-specific data processing options selected by said user, said one or more corresponding actions identified by said processor, said first data table containing said predetermined data, and a second data table containing said updated data, and wherein said processor is further configured to track changes in said predetermined data from an initial state to intermediate states and a final state.

2. The computer-implemented system as claimed in claim 1, wherein one or more spreadsheet-specific data processing options include at least options for sorting said predetermined data, options for filtering said predetermined data based on a plurality of predetermined criteria, and options for applying predetermined mathematical formulae on said predetermined data.

3. The computer-implemented system as claimed in claim 1, wherein said processor is further configured to store said updated data in a second data table, said processor further configured to store said second data table into said database.

4. The computer-implemented system as claimed in claim 1, wherein said processor is further configured to generate said one or more database queries at least partially based on said intermediate representations.

5. The computer-implemented system as claimed in claim 1, wherein said processor is further configured to display resultant of implementation of said one or more database queries on said subset of predetermined data.

6. The computer-implemented system as claimed in claim 1, wherein said processor is further configured to extract said predetermined data stored on at least some of said plurality of columns of said first data table to generate said subset of said predetermined data.

7. A computer-implemented method for transforming data from a source format to a user-desired target format, said method comprising:

storing at least a first data table in a relational database, said first data table comprising predetermined data arranged in a plurality of rows and a plurality of columns, said predetermined data comprising values of a plurality of attributes;

communicably coupling a processor and said relational database, and configuring said processor to:

process said first data table incorporating said predetermined data and programmatically extract a subset of said predetermined data;

programmatically embed into a user interface, one or more spreadsheet-specific data processing options usable for manipulating at least said subset of said predetermined data;

trigger said user interface to display said subset of predetermined data in a predetermined format and to display said one or more spreadsheet-specific data processing options for facilitating manipulation of said subset of predetermined data;

identify said one or more spreadsheet-specific data processing options selected by a user for manipulating said subset of predetermined data, and further identify one or more corresponding actions to be implemented on said subset of predetermined data;

generate a plurality of intermediate representations indicative of said one or more spreadsheet-specific data processing options selected by said user, said one or more corresponding actions identified by said processor, said first data table containing said predetermined data, and a second data table containing said updated data;

track changes in said predetermined data from an initial state to intermediate states and a final state;

automatically generate one or more database queries for executing said one or more actions on said subset of predetermined data, based on said one or more spreadsheet-specific data processing options selected by said user, and thereby programmatically transform said one or more spreadsheet-specific data processing options and said one or more corresponding actions into said one or more database queries;

implement said one or more database queries on said subset of predetermined data;

programmatically extrapolate said one or more database queries to said predetermined data stored on said first data table, and thereby implement said one or more spreadsheet-specific data processing options and said one or more corresponding actions on said predetermined data stored on said first data table, and wherein said one or more database queries are extrapolated to an entirety of said first data table, thereby enabling the processor to:

process the entirety of said predetermined data stored in said first data table, based on said one or more database queries that were previously applied only to said subset of predetermined data extracted from said first data table; and implement said one or more spreadsheet-specific data processing options on the entirety of said first data table and the entirety of said predetermined data stored thereon; and programmatically update said predetermined data stored on said first data table based on implementation of said one or more database queries on said first data table, and create updated data.

8. The computer-implemented method as claimed in claim 7, wherein one or more spreadsheet-specific data processing options include at least options for sorting said predetermined data, options for filtering said predetermined data based on a plurality of predetermined criteria, and options for applying predetermined mathematical formulae on said predetermined data.

9. The computer-implemented method as claimed in claim 7, wherein the method further comprises storing said updated data in a second data table, and storing said second data table into said database.

10. The computer-implemented method as claimed in claim 7, wherein said method further includes
generating said one or more database queries at least partially based on said intermediate representations.

11. The computer-implemented method as claimed in claim 7, wherein said method further comprises displaying on said user interface, resultant of implementation of said one or more database queries on said subset of predetermined data.

12. The computer-implemented method as claimed in claim 7, wherein said method further includes extracting, by said processor, said predetermined data stored on at least some of said plurality of columns of said first data table, and generating said subset of said predetermined data.

13. A non-transitory computer-readable storage medium having stored computer-readable instructions thereon, said computer-readable instructions, when executed by a processor, cause said processor to:
store at least a first data table in a relational database, said first data table comprising predetermined data arranged in a plurality of rows and a plurality of columns, said predetermined data comprising values of a plurality of attributes;
process said first data table incorporating said predetermined data and programmatically extract a subset of said predetermined data;
programmatically embed into a user interface, one or more spreadsheet-specific data processing options usable for manipulating at least said subset of said predetermined data;
trigger said user interface to display said subset of predetermined data in a predetermined format and to display said one or more spreadsheet-specific data processing options for facilitating manipulation of said subset of predetermined data;
identify said one or more spreadsheet-specific data processing options selected by a user for manipulating said subset of predetermined data, and further identify one or more corresponding actions to be implemented on said subset of predetermined data;
generate a plurality of intermediate representations indicative of said one or more spreadsheet-specific data processing options selected by said user, said one or more corresponding actions identified by said processor, said first data table containing said predetermined data, and a second data table containing said updated data;
track changes in said predetermined data from an initial state to intermediate states and a final state;
automatically generate one or more database queries for executing said one or more actions on said subset of predetermined data, based on said one or more spreadsheet-specific data processing options selected by said user, and thereby programmatically transform said one or more spreadsheet-specific data processing options and said one or more corresponding actions into said one or more database queries;
implement said one or more database queries on said subset of predetermined data;
programmatically extrapolate said one or more database queries to said predetermined data stored on said first data table, and thereby implement said one or more spreadsheet-specific data processing options and said one or more corresponding actions on said predetermined data stored on said first data table, and wherein said one or more database queries are extrapolated to an entirety of said first data table, thereby enabling the processor to:
process the entirety of said predetermined data stored in said first data table, based on said one or more database queries that were previously applied only to said subset of predetermined data extracted from said first data table; and
implement said one or more spreadsheet-specific data processing options on the entirety of said first data table and the entirety of said predetermined data stored thereon; and
programmatically update said predetermined data stored on said first data table based on implementation of said one or more database queries on said first data table, and create updated data.

14. The non-transitory computer-readable storage medium as claimed in claim 13, wherein said computer-readable instructions, when executed by said processor, further cause said processor to:
store said updated data in a second data table, said processor further configured to store said second data table into said database;
generate said one or more database queries at least partially based on said intermediate representations;
display resultant of implementation of said one or more database queries on said subset of predetermined data; and
extract said predetermined data stored on at least some of said plurality of columns of said first data table to generate said subset of said predetermined data.

* * * * *